(12) United States Patent
Yi et al.

(10) Patent No.: US 10,041,145 B2
(45) Date of Patent: Aug. 7, 2018

(54) METHOD OF SEPARATING AND RECOVERING VALUABLE METAL FROM REMANUFACTURING SOLUTION OF SPENT DESULFURIZATION CATALYST CONTAINING VANADIUM

(71) Applicants: SUNGEEL HITECH CO., LTD., Incheon (KR); KC COTTRELL CO., LTD., Seoul (KR)

(72) Inventors: Kang-Myung Yi, Seoul (KR); Ki-Woong Lee, Hwaseong-si (KR); Hong-In Kim, Incheon (KR); Mishra Debaraj, Daejeon (KR); Kwang-Joong Kim, Incheon (KR)

(73) Assignee: SUNGEEL HIMETAL, Gunsan-si, Jeollabuk- (KR)

( * ) Notice: Subject to any disclaimer, the term of this patent is extended or adjusted under 35 U.S.C. 154(b) by 415 days.

(21) Appl. No.: 14/900,109

(22) PCT Filed: Oct. 4, 2013

(86) PCT No.: PCT/KR2013/008876
§ 371 (c)(1),
(2) Date: Dec. 18, 2015

(87) PCT Pub. No.: WO2014/208819
PCT Pub. Date: Dec. 31, 2014

(65) Prior Publication Data
US 2016/0138131 A1 May 19, 2016

(30) Foreign Application Priority Data
Jun. 28, 2013 (KR) .................. 10-2013-0075021

(51) Int. Cl.
*C22B 34/22* (2006.01)
*C01G 31/02* (2006.01)
(Continued)

(52) U.S. Cl.
CPC ............ *C22B 34/225* (2013.01); *C01G 31/02* (2013.01); *C01G 39/003* (2013.01);
(Continued)

(58) Field of Classification Search
None
See application file for complete search history.

(56) References Cited

FOREIGN PATENT DOCUMENTS

| JP | 2011-168835 | 9/2011 |
|---|---|---|
| KR | 10-2008-0107905 | 12/2008 |

(Continued)

OTHER PUBLICATIONS

International Search Report of corresponding PCT/KR2013/008876, dated Nov. 28, 2013, 4 pages.

*Primary Examiner* — Melissa S Swain
(74) *Attorney, Agent, or Firm* — Lewis Roca Rothgerber Christie LLP (57) ABSTRACT

The disclosure describes a method of separating and recovering valuable metals from remanufacturing solution of a spent desulfurization catalyst containing vanadium, and more particularly, to a method of separating and recovering a valuable metal from remanufacturing solution of a spent desulfurization catalyst containing vanadium, which includes: adding organic acid to a spent hydrodesulfurization catalyst after collecting the spent hydrodesulfurization catalyst in order to prepare the remanufacturing solution of the spent hydrodesulfurization catalyst; adding an extracting agent and a diluent to the remanufacturing solution to extract molybdenum and extracting vanadium from an extracted filtrate to obtain an organic phase; and adding a stripping agent to the organic phase to strip and recover vanadium.

14 Claims, 8 Drawing Sheets

(51) Int. Cl.
*C01G 39/00* (2006.01)
*C22B 7/00* (2006.01)
*C22B 3/26* (2006.01)
*C22B 34/34* (2006.01)

(52) U.S. Cl.
CPC ............ *C22B 3/0005* (2013.01); *C22B 7/006* (2013.01); *C22B 34/345* (2013.01); *Y02P 10/23* (2015.11); *Y02P 10/234* (2015.11)

(56) References Cited

FOREIGN PATENT DOCUMENTS

| | | |
|---|---|---|
| KR | 10-2009-0132462 | 12/2009 |
| KR | 10-2012-0043358 | 5/2012 |
| KR | 10-2012-0128913 | 11/2012 |

METHOD OF SEPARATING AND RECOVERING VALUABLE METAL FROM REMANUFACTURING SOLUTION OF SPENT DESULFURIZATION CATALYST CONTAINING VANADIUM

CROSS-REFERENCED TO RELATED APPLICATION(S)

This Application is a National Phase Patent Application and claims priority to and the benefit of International Application Number PCT/KR2013/008876, filed on Oct. 4, 2013, which claims priority to and the benefit of Korean Application 10-2013-0075021, filed Jun. 28, 2013, the entire contents of all of which are incorporated herein by reference.

TECHNICAL FIELD

The present invention relates to a method of separating and recovering valuable metals from remanufacturing solution of a spent desulfurization catalyst containing vanadium.

BACKGROUND ART

Currently, oil refinery companies have operated processes of converting heavy crude oil into light crude oil having higher economic value. To smoothly operate the processes, hydrodesulfurization (HOU HDS) and hydrodemetallization (HDM) catalysts for removing much sulfur and/or many heavy metal components contained in the heavy crude oil have been used and exchanged into new catalysts three or four times a year due to the durability of the catalyst itself.

Although various kinds of desulfurization catalysts are used for various processes, the desulfurization catalysts are typically used in oil refinery factories. An Ni—Mo/$Al_2O_3$ or Co—Mo/$Al_2O_3$ catalyst is commercially used as the hydrodesulfurization catalyst. Mo, Co and Ni components remain on the spent hydrodesulfurization catalyst intact without any loss, but a large amount of vanadium, contained in heavy crude oil is deposited on the spent hydrodesulfurization catalyst instead.

Although there is required to economically recover variable metals such as V, No, Co and Ni existing in a spent catalyst, the spent catalyst is coated with waste oil of 20% or more including a sulfur component and is classified as a specified waste among environmental wastes, so that it is not easy to treat the spend catalyst.

Therefore, since the valuable metals contained in the spent catalyst, of which the mineral resources are rare and the bearing areas are regionally distributed, are very expensive and entirely dependent on import, there is a need to provide a method of effectively recovering the valuable metals from the spent catalyst containing the valuable metals.

As a related art, there has been disclosed a method of separating and recovering $V_2O_5$, $MoO_3$ and NiO from a spent catalyst containing vanadium, molybdenum and nickel in Korean Unexamined Patent Publication No. 10-2009-0132462 (published on Dec. 30, 2009).

DISCLOSURE

Technical Problem

Thus, the present invention provides a method of separating and recovering valuable metals from a spent desulfurization catalyst containing vanadium at a high rate.

The problems sought to be solved by the present invention are not limited to the above description and other problems may be clearly understood by those skilled in the art from the following description

Technical Solution

To solve the problems, the present invention provides a method of separating and recovering a valuable metal from remanufacturing solution of a spent desulfurization catalyst containing vanadium, which includes adding organic acid to a spent hydrodesulfurization catalyst after collecting the spent hydrodesulfurization catalyst in order to prepare the remanufacturing solution of the spent hydrodesulfurization catalyst; adding an extracting agent and a diluent to the remanufacturing solution to extract molybdenum and extracting vanadium from an extracted filtrate to obtain an organic phase; and adding a stripping agent to the organic phase to strip and recover vanadium.

The method further includes adding calcium salt to the remanufacturing solution to remove the organic acid, wherein the calcium salt is one selected from the group consisting of $CaCl_2$, $Ca(OH)_2$ and $CaSO_4$.

The organic acid includes oxalic acid.

The extracting agent includes at least one selected from the group consisting of amine, 2-hydroxy-5-nonylacetophenone oxime and tri-butyl phosphate.

Equilibrium pH is in a range of 0.3 to 1.0 when extracting the molybdenum and a volumetric ratio between the extracting agent and the diluent and the remanufacturing solution is 1~5:5~1.

Equilibrium pH is in a range of 3.0 to 4.0 when extracting the vanadium and a volumetric ratio between the organic phase and a water phase included in the extracted filtrate is 1~5:5~1.

The stripping agent includes $Na_2CO_3$ or $H_2SO_4$.

The stripping is performed at a volumetric ratio between the organic phase and the stripping agent of 1~10:1.

The recovering is performed at 7.5~8.5 pH by using ammonia water.

The extracting, the stripping and the recovering are performed in a mixer-settler.

In addition, according to the present invention, there is provided a method of preparing selective catalytic reduction impregnation solution, the method comprising calcinating vanadium after recovering the vanadium by using the method described above.

The calcinating is performed for three hours at temperature in a range of 450~550° C.

Advantageous Effects

According to the present invention, molybdenum and vanadium may be separated and recovered at a high rate from the remanufacturing solution of a spent desulfurization catalyst containing vanadium, and the recovered vanadium may be used as impregnation solution used to prepare a selective catalytic reduction catalyst through an additional process.

In addition, the extracting rates of uranium and vanadium from a spent catalyst containing a small amount of variable metals may be improved, and uranium and vanadium may be solvent-extracted by controlling pH so that uranium and vanadium may be extracted at low cost.

BEST MODE

Hereinafter, a preferable embodiment according to the present invention will be described in detail with reference to accompanying drawings.

The advantages, the features, and schemes of achieving the advantages and features of the present invention will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled, in the art to completely comprehend the scope of the present invention. The present invention is only defined within the scope of accompanying claims.

In addition, the details of the generally-known technology that makes the subject matter of the present invention unclear will be omitted in the following description.

The present invention provides a method of separating and recovering a valuable metal from remanufacturing solution of a spent desulfurization catalyst containing vanadium, which includes the steps of: adding organic acid to a spent hydrodesulfurization catalyst after collecting the spent hydrodesulfurization catalyst in order to prepare remanufacturing solution of the spent hydrodesulfurization catalyst;

adding an extracting agent and a diluent to the remanufacturing solution to extract molybdenum and extracting vanadium from an extracted filtrate to obtain an organic phase; and adding a stripping agent to the organic phase to strip and recover vanadium.

Figure 1:
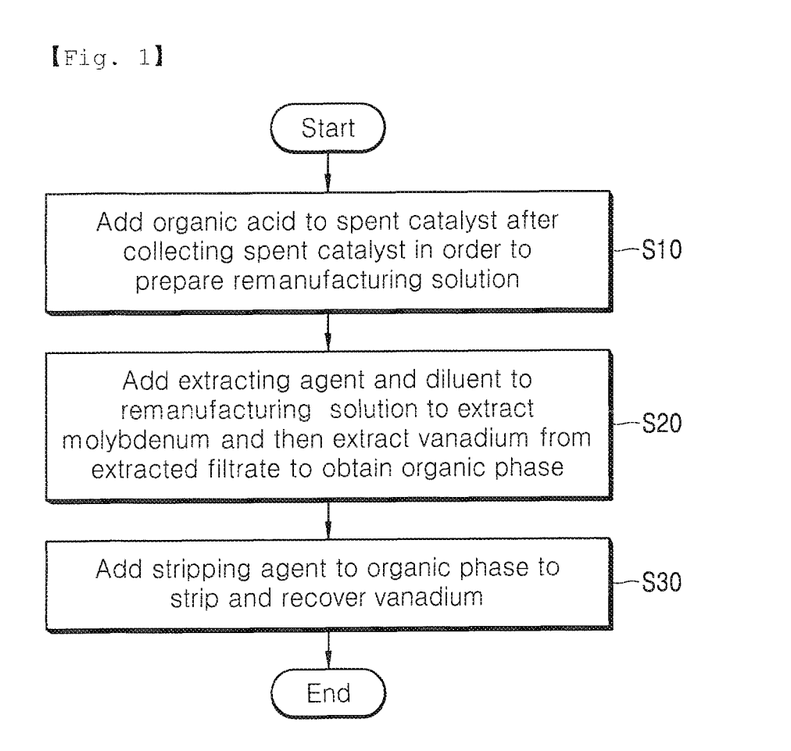
FIG. 1 is a flowchart illustrating a method of separating and recovering a valuable metal from remanufacturing solution of a spent desulfurization catalyst containing vanadium according to the present invention.

FIG. 1 is a flowchart illustrating a method of separating and recovering a valuable metal from remanufacturing solution of a spent desulfurization catalyst containing vanadium according to the present invention. The present invention will be described in detail, with reference to FIG. 1.

The method of separating and recovering a valuable metal from remanufacturing solution of a spent desulfurization catalyst containing vanadium according to the present invention includes the step S10 of adding organic acid to a spent hydrodesulfurization catalyst after collecting the spent hydrodesulfurization catalyst in order to prepare remanufacturing solution of the spent hydrodesulfurization catalyst.

According to the method of separating and recovering a valuable metal from remanufacturing solution of a spent desulfurization catalyst containing vanadium of the present invention, the spent hydrodesulfurization catalyst contains the vanadium and the spent hydrodesulfurization catalyst may be cleaned with organic acid, for example, oxalic acid of 10 volume % in order to prevent impurities from being dissolved.

In addition, the method of separating and recovering a valuable metal from remanufacturing solution of a spent desulfurization catalyst containing vanadium according to the present invention may further include a step of adding calcium salt to the remanufacturing solution to remove the organic acid.

The removal of the organic acid from the remanufacturing solution is performed to solve a problem that the organic acid disturbs the separation between the organic phase and water phase during a solvent extraction process so that the phase separation is not smoothly performed.

The calcium salt may be one selected from the group consisting of $CaCl_2$, $Ca(OH)_2$ and $CaSO_4$.

The method of separating and recovering a valuable metal from remanufacturing solution of a spent desulfurization catalyst containing vanadium according to the present invention includes the step S20 of adding an extracting agent and a diluent to the remanufacturing solution to extract molybdenum and then, extracting vanadium from an extracted filtrate to obtain an organic phase.

The solvent extraction scheme utilizes the material distribution difference between two liquid phases which cannot be mixed with each other, where one liquid phase is aqueous solution phase containing a target component to be extracted and the other is an organic solvent layer including an organic extracting agent and a diluent, that is, an organic phase. The extracting according to the present invention is a process of transferring a target component (molybdenum or vanadium) from the aqueous solution phase to the organic phase by the extracting agent.

The extracting agent may include at least one selected from the group consisting of amine (Alamine 336), 2-hydroxy-5-nonylacetophenone oxime (LIX 841) and tri-butyl phosphate (TBP), and the diluent may include kerosene which is dearomatized hydrocarbon.

In addition, it is preferable that equilibrium pH is in a range of 0.3 to 1.0 when extracting the molybdenum.

When the molybdenum is extracted, although a volumetric ratio between the extracting agent and the diluent (organic phase) and the remanufacturing solution may be various, it is preferable that the volumetric ratio is 1~5:5~1. When the volumetric ratio is out of the above range, the extracting rate of molybdenum is reduced.

When the vanadium is extracted, preferably, the equilibrium pH is in the range of 3.0~4.0. When the equilibrium pH is less than 3.0, the extracting ratio of vanadium is low, and when the equilibrium pH exceeds 4.0, the extracting ratio of vanadium is not increased anymore. When the vanadium is extracted, although the volumetric ratio between the organic phase and the water phase included in the extracted filtrate may be various according to the concentration of the vanadium, it is preferable that the volumetric ratio is in the range of 1~5:5~1. When the volumetric ratio is out of the above range, the extracting ratio of vanadium is reduced.

The method of separating and recovering a valuable metal from remanufacturing solution of a spent desulfurization catalyst containing vanadium according to the present invention includes the step S30 of adding a stripping agent to the organic phase to strip and recover vanadium.

The stripping according to the present invention is a process of transferring the vanadium from an organic phase to a water phase. The stripping may be performed through two stages (two stripping processes).

The stripping agent may include $Na_2CO_3$ or $H_2SO_4$. In this case, the stripping is preferably performed at a volumetric ratio between the organic phase and the stripping agent in the range of 1~10:1. When the organic phase is less than 1, the concentration of the stripped vanadium is lowered. When the organic phase exceeds 10, the stripping rate is not increased anymore.

In addition, the recovering is preferably performed at 7.5~8.5 pH by using ammonia water. When the pH is less than 7.5, the recovery rate of vanadium is lowered. When the pH exceeds 8.5, the recovery rate of vanadium is not increased anymore.

In addition, according to the present invention, there is provided a method of preparing selective catalytic reduction impregnation solution, which includes the step of calcinating vanadium after recovering the vanadium by using a method of separating and recovering a valuable metal from remanufacturing solution of a spent desulfurization catalyst containing vanadium, which includes the steps of: adding organic acid to a spent hydrodesulfurization catalyst after collecting the spent hydrodesulfurization catalyst in order to prepare remanufacturing solution of the spent hydrodesulfurization catalyst; adding an extracting agent and a diluent to the remanufacturing solution to extract molybdenum and extracting vanadium from an extracted filtrate to obtain an organic phase; and adding a stripping agent to the organic phase to strip and recover vanadium.

The vanadium, which is recovered through a method of separating and recovering a valuable metal from remanufacturing solution of a spent desulfurization catalyst containing vanadium according to the present invention, is recovered as ammonium meta vanadate ($NH_4VO_3$) which is a precipitate having a color of dark brown, and then, the recovered ammonium meta vanadate is calcinated, thereby obtaining $V_2O_5$ in the form of oxide. Preferably, the calcination is performed at 450~550° C. for 3 hours. When the temperature of the calcination is less than 450° C., the calcination time is too long. When the temperature of the calcination exceeds 550° C., the energy consumption is increased due to the high temperature.

The $V_2O_5$ prepared through the above described method may be used for the selective catalytic reduction impregnation solution.

MODE FOR INVENTION

Embodiment 1: Separation and Recover of Valuable Metal from Remanufacturing Solution of Spent Desulfurization Catalyst Containing Vanadium 1

Step of Adding Organic Acid to a Spent Hydrodesulfurization Catalyst after Collecting the Spent Hydrodesulfurization Catalyst in Order to Prepare Remanufacturing Solution of the Spent Hydrodesulfurization Catalyst:

A waste liquid containing vanadium, molybdenum and aluminum had been collected from a spent hydrodesulfurization catalyst. The waste liquid is generated during the process of cleaning the spent catalyst. The waste liquid had been cleaned with oxalic acid of 10 volume % to prevent other impurities of the catalyst from being resolved so that the remanufacturing solution of the spent hydrodesulfurization catalyst had been prepared. The metal content of the waste liquid had been analyzed with an ICP-OES, so that the waste liquid had contained Mo of 1.40 g/l, V of 1.24 g/L and Al of 1.77 g/L.

Step of Adding an Extracting Agent and a Diluent to the Remanufacturing Solution to Extract Molybdenum and Extracting Vanadium from an Extracted Filtrate to Obtain an Organic Phase:

The solvent extraction had been performed by using Alamine 336 (IS Chem, Korea) as an organic extracting agent. The organic extracting agent had been used without any cleaning processes. Additionally, a large amount of tributyl phosphate (TBP, Samchun Chemical, Korea) had been added to the organic extracting agent. The remanufacturing solution of the spent hydrodesulfurization catalyst had been used as aqueous solution for the extracting process. The pH had been adjusted to a desired degree by adding concentrated $H_2SO_4$ or NaOH solution. In the solvent extracting process, the extracting agent and diluent had been added to the remanufacturing solution, and the solution had been shaken for 5 minutes in a vertical-reciprocating shaker by using a separation funnel of 100 mL. Then, the solution was left for 10 minutes for the phase separation. The extracting rate may be calculated as the following Equation 1.

Extracting rate (%)=(Concentration of extracted metal in organic phase/Concentration of metal included in remanufacturing solution)×100 [Equation 1]

Figure 2:
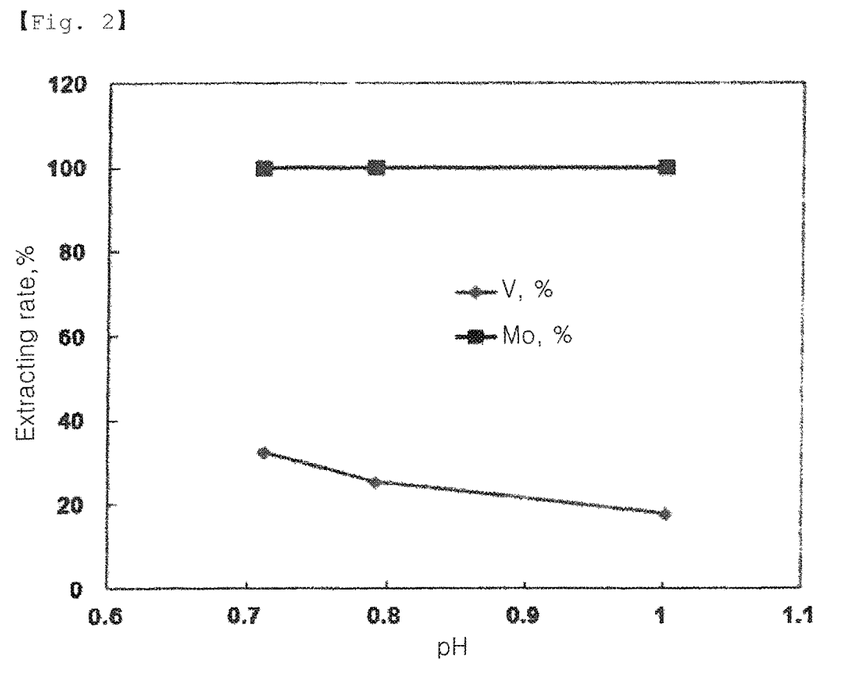
FIG. 2 is a graph illustrating an extracting rate of Mo and V at a low pH in case of solvent extraction using Alamine 336.

The solvent extraction of molybdenum had been performed at 0.65 pH and 25° C. by using Alamine 336 and Exxol D-80 of 20 volume %. FIG. 2 is a graph illustrating an extracting rate of Mo and V at a low pH in case of solvent extraction using Alamine 336. As shown in FIG. 2, it had been confirmed that Mo is extracted to 99% or more and V is extracted to about 30% at a low pH. Thus, it is preferable to extract V from the extracted filtrate after extracting Mo at a low pH.

The solvent extraction of vanadium had been performed by using 2-hydroxy-5-nonylacetophenone oxime (LIX 84I) and Exxol D-80 of 20 volume %.

Step of Adding a Stripping Agent to the Organic Phase to Strip and Recover Vanadium:

The stripping of the vanadium-extracted organic phase had been performed with $Na_2CO_3$ of 1M at A/O ratio of 1. The vanadium of 83% had been stripped into solution and the vanadium in the solution had been recovered by adding ammonia water thereto and controlling the pH to be in the range of 7.5~8.0.

Embodiment 2: Separation and Recover of Valuable Metal from Remanufacturing Solution of Spent Desulfurization Catalyst Containing Vanadium 2

The valuable metals had been separated and recovered from the remanufacturing solution through the same method as that of Embodiment 1 except for the process of precipitating oxalate ions with $CaCl_2$ to remove the oxalate ions from the waste liquid before performing the solvent extracting process. The removal of the oxalate ions is for the purpose of preventing organic solvents containing oxalate from reacting with each other during the solvent extracting process. For precipitation, the remanufacturing solution to which $CaCl_2$ is added had been continuously agitated for 12 hours in chemical stoichiometry. The precipitate had been separated from the solution by filtering the solution with a glass membrane filter having a pore size of 0.45 μm after the agitation, so as to collect the filtered solution. The oxalate precipitation reaction using $CaCl_2$ is expressed as the following chemical formula 1.

$CaCl_2+H_2C_2O_4 \rightarrow CaC_2O_4+2HCl$ [Chemical formula 1]

The oxalic acid had been removed by adding $CaCl_2$ of 1~10 volume % into the remanufacturing solution while varying the concentration of $CaCl_2$, and the kinds and amounts of metals included in the remanufacturing solution according to the concentration of $CaCl_2$ are shown in following Table 1.

TABLE 1

| $CaCl_2$ (volume %) | V (mg/L) | Mo (mg/L) | Al (mg/L) | Ca (mg/L) |
|---|---|---|---|---|
| 1 | 1250 | 1898 | 2222 | 320 |
| 3 | 1276 | 1936 | 2266 | 477 |
| 5 | 1260 | 1921 | 2244 | 506 |
| 7 | 1272 | 1962 | 2285 | 564 |
| 10 | 1281 | 1983 | 2329 | 601 |

As shown in Table 1, it is known that the concentrations of the other metals except for Ca are not changed.

To reduce the concentration of Ca in the remanufacturing solution, $CaCl_2$ solution of 7 volume % had been used and the concentrations of the other metal components in the $CaC_2O_4$-removed remanufacturing solution are not greatly changed.

Embodiment 3: Separation and Recover of Valuable Metal from Remanufacturing Solution of Spent Desulfurization Catalyst Containing Vanadium 3

Figure 3:
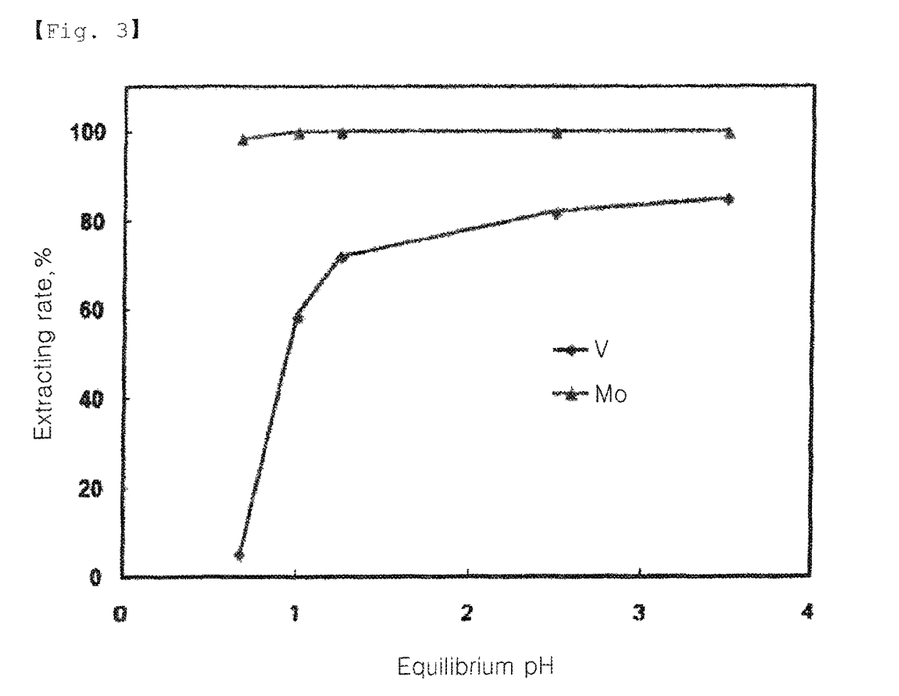
FIG. 3 is a graph illustrating an extracting rate of molybdenum and vanadium according to an equilibrium pH.

The vanadium had been extracted through the same method as that of Embodiment 2 except for mixing Alamine 330 of 20 volume % with TBP and kerosene of 15 volume % to extract vanadium at 3.5 pH and O/A ratio of 1. In this case, the extracting rate of vanadium was 85%. FIG. 3 is a graph illustrating an extracting rate of molybdenum and vanadium according to an equilibrium pH. As shown in FIG. 3, the extraction of Mo was higher than that of V at a low pH. As the equilibrium pH had been increased, the extracting rate of vanadium had been increased. Both Mo and V were extracted at the equilibrium pH of 2.0. According to the present invention, after removing Mo at a low equilibrium Ph where vanadium can be reused in the form of $V_2O_5$, the vanadium had been extracted from the extracted filtrate (raffinate, materials or liquid remaining after removing most of materials used in the solvent extracting process) containing vanadium (IV) and aluminum (III) by increasing pH.

Figure 4:
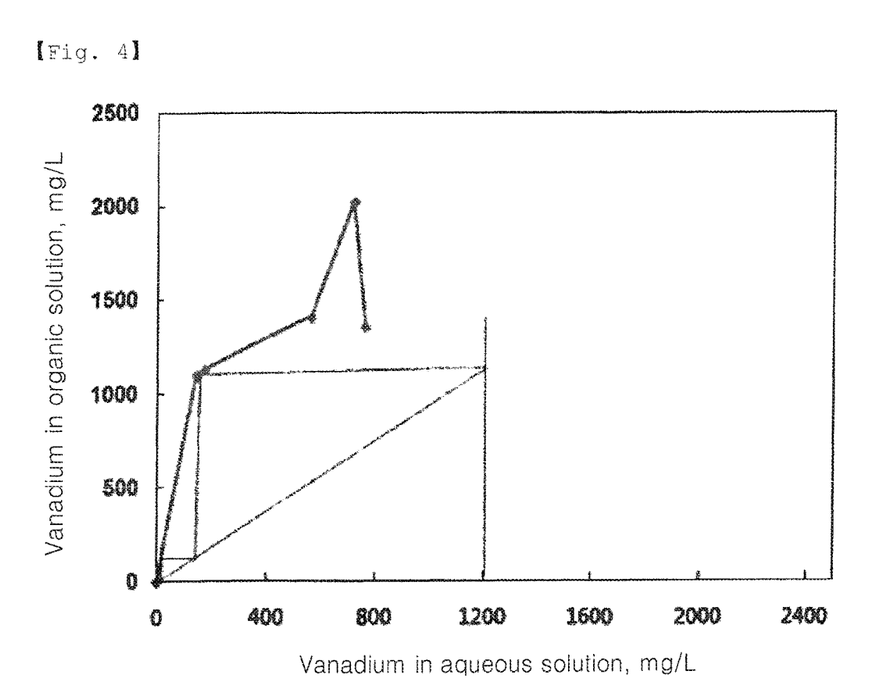
FIG. 4 is a graph illustrating McCabe Thile diagram during the solvent extraction of vanadium.

FIG. 4 is a graph illustrating McCabe Thile diagram during the solvent extraction of vanadium. As shown in FIG. 4, when the vanadium had been solvent-extracted, there had been required three stages (there extracting processes) in theory to extract V having A/O ratio of 2:1 and 1.27 g/L. Thus, it was known that the number of suitable extracting stages is three stages.

Embodiment 4: Preparing of Selective Catalytic Reduction Impregnation Solution The precipitate of dark brown obtained in Embodiment 3 had been calcinated at 500° C. for three hours to prepare $V_2O_5$ and the prepared $V_2O_5$ had been used to prepare the selective catalytic reduction impregnation solution.

Experimental Example 1: Result of Maximum Value of Vanadium Existing in Organic Phase in Embodiment 3

Figure 5:
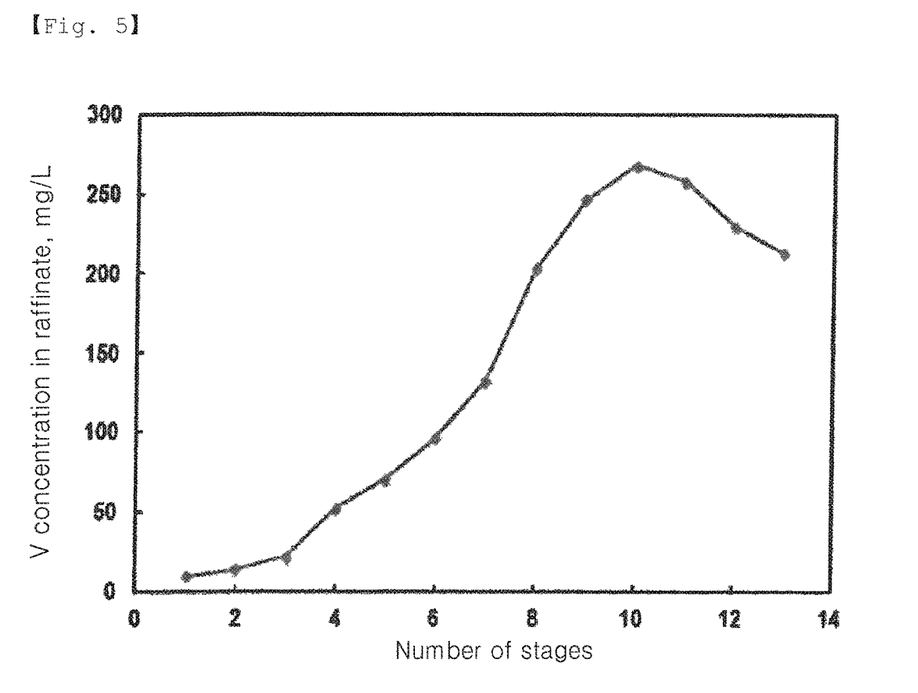
FIG. 5 is a graph illustrating a maximum extraction experiment result of V in organic phases where which vanadium is extracted.

FIG. 5 is a graph illustrating a maximum extraction experiment result of V in organic phases after vanadium is extracted. As shown in FIG. 5, it can be understood that V existed in the organic phase where vanadium had been extracted after extracting Mo and the concentration of V in the extracted filtrate (raffinate) was increased through eight times of extractions. In this case, the maximum extracting rate of V was about 10 g or more.

Experimental Example 2: Result of Stripping Isotherm of Vanadium in the Stripping Process of Embodiment 3

Figure 6:
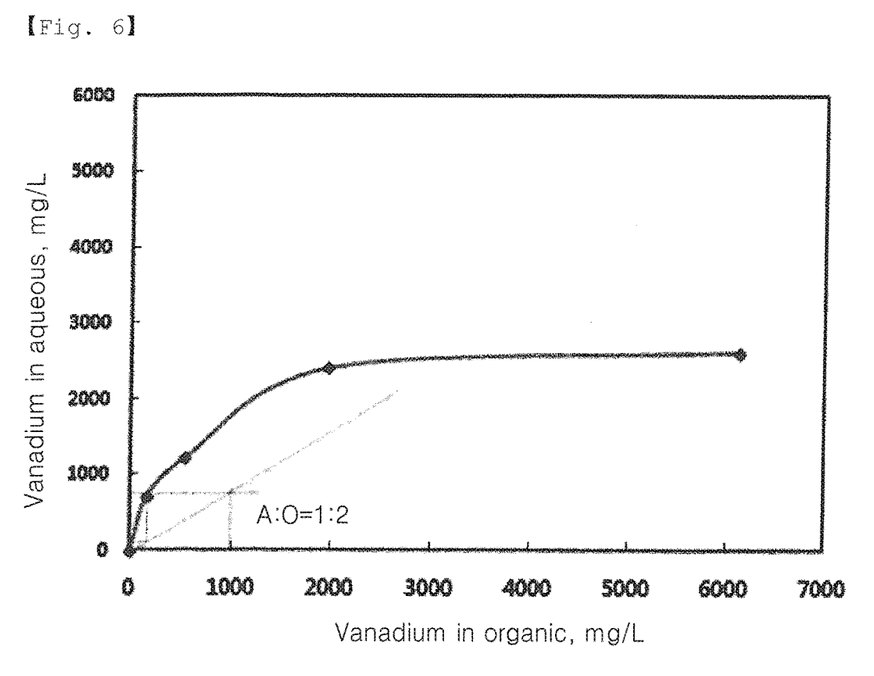
FIG. 6 is a graph illustrating a stripping isotherm of vanadium using $Na_2CO_3$ of 1 M.

As shown in FIG. 6, it can be theoretically understood that vanadium can be stripped at O/A ratio of 2 through two stages (the stripping process is performed twice). To support it, V had been completely stripped through the stripping of two stages from the organic phase where vanadium had been extracted in the stripping process using $H_2SO_4$ of 5 M and O:A=3:1. At the first stripping, the vanadium concentration was 6344 mg/L and at the second stripping, the vanadium concentration was 674 mg/L.

In addition, the a method of separating and recovering a valuable metal from remanufacturing solution of a spent desulfurization catalyst containing vanadium according to the present invention may be performed through a mixer-setter. The vanadium may be concentrated after being separated from the spent desulfurization catalyst containing vanadium by using the mixer-settler which can continuously recover a valuable metal using an effective cross flow scheme. When the reaction is performed for 20 hours at the flow of the organic phase (extracting agent and diluent) of 40 mL, the flow of the water phase (remanufacturing solution) of 80 mL and O:A=1:2 in extracting, the recovering amount of V per a day is about 115 g. In this case, the maintaining time in the mixer is 12.5 minutes and when a suitable maintaining time was in the range of 6~8 minutes, the maximum recovering amount of V per a day is about 230 g. When it is assumed that the amount of V contained in the spent catalyst is 10%, the maximum recovering amount of V is equal to that obtained by treating the catalyst of about 2.3 kg.

Figure 7:
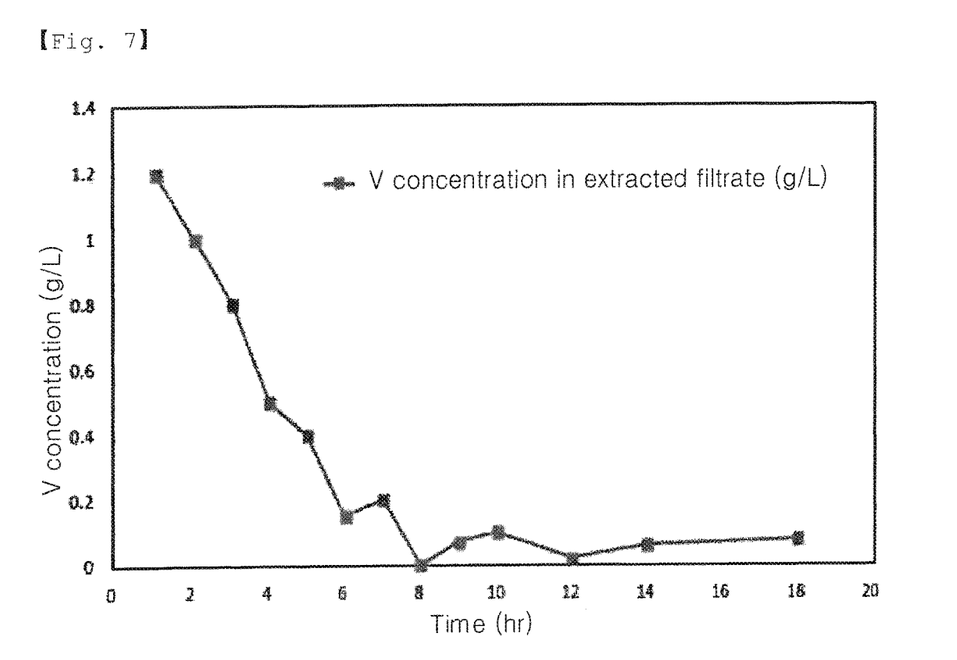
FIG. 7 is a graph illustrating the concentration of V after extracting V from an extracted filtrate using a mixer-settler.

FIG. 7 is a graph illustrating the concentration of V after extracting V from an extracted filtrate using a mixer-settler. As shown in FIG. 7, the concentration of V had been extracted at 1.2 g/L and had reached the equilibrium after about eight hours. After V had been extracted, the concentration of V had been maintained at 100 ppm or less, and at this time, the extracting rate had been 91.7% or more.

A waste water treatment system using ion exchange resin may be appropriate to recover V remaining in the extracted filtrate. In this case, positive ion exchange resin and negative, ion exchange resin available from LEWATIT company may be used as the ion exchange resin.

Figure 8:
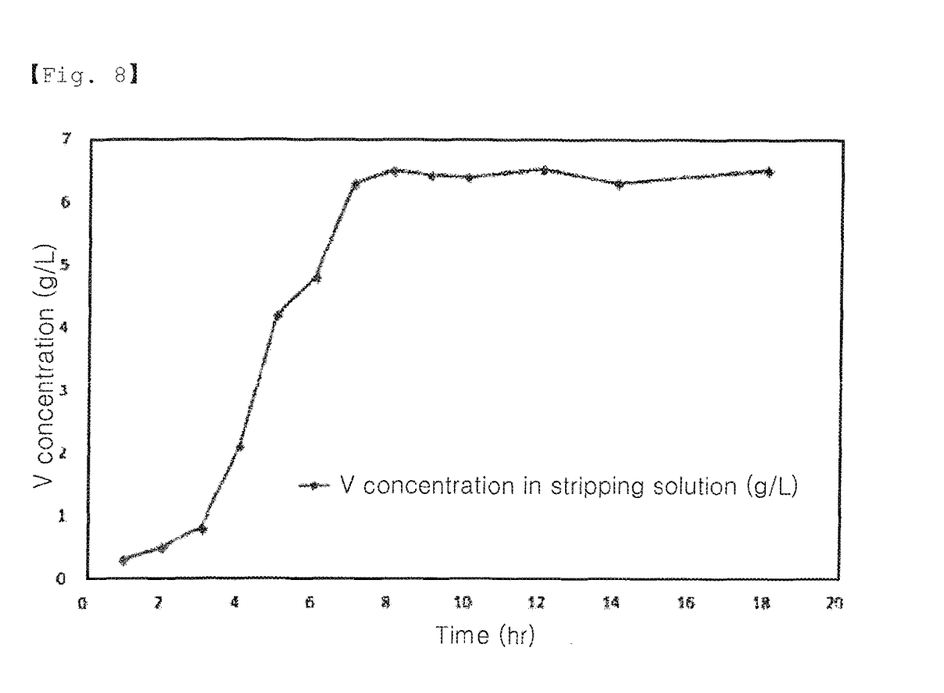
FIG. 8 is a graph illustrating the concentration of V stripped from the organic phase where vanadium is extracted by using a mixer-settler.

FIG. 8 is a graph illustrating the concentration of V stripped from the organic phase where vanadium is extracted by using a mixer-settler. As shown in FIG. 8, the concentration of V had started from 0.3 g/L and reached the equilibrium after seven hours. The concentration of V in stripping solution was 6.5 g/L or more.

The invention claimed is:
1. A method of separating and recovering a valuable metal from remanufacturing solution of a spent desulfurization catalyst containing vanadium, the method comprising:
   adding organic acid to a spent hydrodesulfurization catalyst after collecting the spent hydrodesulfurization catalyst in order to prepare the remanufacturing solution of the spent hydrodesulfurization catalyst;

adding an extracting agent and a diluent to the remanufacturing solution to extract molybdenum and extracting vanadium from an extracted filtrate to obtain an organic phase; and adding a stripping agent to the organic phase to strip and recover vanadium.

2. The method of claim 1, further comprising adding calcium salt to the remanufacturing solution to remove the organic acid.

3. The method of claim 2, wherein the calcium salt is one selected from the group consisting of $CaCl_2$, $Ca(OH)_2$ and $CaSO_4$.

4. The method of claim 1, wherein the organic acid includes oxalic acid.

5. The method of claim 1, wherein the extracting agent includes at least one selected from the group consisting of amine, 2-hydroxy-5-nonylacetophenone oxime and tri-butyl phosphate.

6. The method of claim 1, wherein the diluent includes kerosene.

7. The method of claim 1, wherein equilibrium pH is in a range of 0.3 to 1.0 when extracting the molybdenum and a volumetric ratio between the extracting agent and the diluent and the remanufacturing solution is 1~5:5~1.

8. The method of claim 1, wherein equilibrium pH is in a range of 3.0 to 4.0 when extracting the vanadium and a volumetric ratio between the organic phase and a water phase included in the extracted filtrate is 1~5:5~1.

9. The method of claim 1, wherein the stripping agent includes $Na_2CO_3$ or $H_2SO_4$.

10. The method of claim 1, wherein the stripping is performed at a volumetric ratio between the organic phase and the stripping agent of 1~10:1.

11. The method of claim 1, wherein the recovering is performed at 7.5~8.5 pH by using ammonia water.

12. The method of claim 1, wherein the extracting, the stripping and the recovering are performed in a mixer-settler.

13. A method of preparing selective catalytic reduction impregnation solution, the method comprising calcinating vanadium after recovering the vanadium by using a method according to claim 1.

14. The method of claim 13, wherein the calcinating is performed for three hours at a temperature in a range of 450~550° C.

* * * * *